United States Patent [19]

Hooker

[11] 4,087,296
[45] May 2, 1978

[54] METHOD FOR APPLYING MEMBRANE-COVERED RIGID FOAM TO BUILDING SURFACE

[76] Inventor: Thomas Hooker, 560 Lockport St., Youngstown, N.Y. 14174

[21] Appl. No.: 682,468

[22] Filed: May 3, 1976

Related U.S. Application Data

[62] Division of Ser. No. 481,344, Jun. 20, 1974, Pat. No. 3,954,544.

[51] Int. Cl.$^2$ ............................................. B32B 5/20
[52] U.S. Cl. ...................................... 156/71; 156/79; 156/357; 264/45.5; 264/35; 425/4 C; 425/817 C; 428/311
[58] Field of Search ............ 156/71, 79, 78, 356, 156/357; 264/45.5, 35; 428/311; 425/4 C, 817 C

[56] References Cited

U.S. PATENT DOCUMENTS

| | | | |
|---|---|---|---|
| 3,189,498 | 6/1965 | Rapp | 156/71 |
| 3,240,655 | 3/1966 | Voelker | 156/79 |
| 3,598,671 | 8/1971 | Wortman | 156/79 |
| 3,698,972 | 10/1972 | Lenzner | 156/71 |
| 3,959,049 | 5/1976 | Tanaka et al. | 156/79 |

Primary Examiner—Edward G. Whitby
Attorney, Agent, or Firm—Raymond F. Kramer

[57] ABSTRACT

An apparatus for in situ preparing and applying foam to a surface, such as a roof, and at the same time applying a membrane onto the surface of the foam, produces a foam-membrane sandwich having an upper surface of controlled smoothness and thickness or pitch, which sandwich is firmly held to the treated surface. The apparatus is normally self-propelled and may be automatically controlled so as to be advanced across the surface to be coated with membrane-covered rigid polymeric foam, preferably of polyurethane foam, as the curing pre-foam and covering membrane are applied. In preferred embodiments of the invention the membrane is a roofing felt or fiberglass web, mat, treated paper or cloth fed from the apparatus from a roll thereon, producing with the roof or other surface to be coated, a form into which a curing pre-foam is deposited as the apparatus is advanced.

Also within the invention are processes of producing a membrane-covered, rigid polymeric foam covering on surfaces, such as roofs, by application of a curing pre-foam to the roof under a covering, smoothing and height- or pitch-establishing membrane to which the foam adheres upon curing.

10 Claims, 10 Drawing Figures

METHOD FOR APPLYING MEMBRANE-COVERED RIGID FOAM TO BUILDING SURFACE

This application is a division of my co-pending patent application Ser. No. 481,344, filed June 20, 1974, which is now U.S. patent 3,954,544, granted May 4, 1976.

This invention is of an apparatus for the application of a membrane-covered polymeric foam to surfaces. More particularly, the invention is of an apparatus for the in situ preparation of foam-membrane sandwich insulation of controlled smoothness, thickness or pitch and application thereof to a surface, such as a roof, by depositing a curable or curing pre-foam of a rigid polymeric material onto the surface while simultaneously laying a cover membrane on the foam. The invention also relates to a process for producing such foam-membrane sandwiches and applying them to surfaces, such as roofs.

Conventional building insulation, such as that for roofs and floors of buildings, is usually of conveniently sized panels of fibrous, cellular, vegetable or mineral board which is partially or completely cemented or otherwise mechanically attached to a structural deck or sub-deck. Such insulation is usually protected by a waterproof membrane such as built-up roofing. However, leakage through the membrane, liquid water and water vapor movement into and through the insulation space, repeated freezings and thawings and differential thermal movements cause stresses and often result in ruptures of the membrane, resulting in leaks, saturation of the insulation and damage to the structure and contents, which are especially bad because the insulation is not air- or liquid-tight and because leakage occurs readily in the seams and spaces between pieces of insulation.

Because of the disadvantages of the prior art building insulations and coatings, monolithic sprayed polyurethane foam insulation for roofing and similar applications has recently been favored because, when suitably weather protected, such insulation has eliminated most of the mentioned problems. Still, polyurethane foam insulation has not been as widely accepted as might have been expected, due to the difficulty of producing a smooth surface of such a foam by normal hand application techniques. The rough surfaces often resulting are aesthetically unsatisfactory and often are architecturally unacceptable because of poor thickness control and uneven application, leading to low spots which tend to hold water. Also, it is very difficult by hand application of polyurethane and similar polymeric foams to correct water ponding conditions which may have resulted from settling of the building, overloading of spans thereof or design and construction errors. Furthermore, the production of foam oversprays, which cause harmful depositions of finely divided foam particles on nearby structures and vehicles have limited hand spray foam applications on outdoor structures, such as roofs, to those days on which wind velocity is minimal or to those locations wherein downwind of the spraying there are few people, structures or vehicles which might be harmed by the overspray. This complicates the scheduling of roofing work, results in lost work time and often precludes entirely any such work upwind of vehicle parking areas.

The various disadvantages of the prior art methods for hand applications of polyurethane and other polymeric foams to surfaces have been overcome by the present invention. Foam oversprays are no longer a problem. The upper surface of the applied foam is smooth and by the method of this invention, utilizing apparatus described herein, there is producible a uniform layer of a foam-membrane sandwich of desired thickness. Furthermore, ponding may be avoided and if present on the previous roof structure, may be corrected. A perfectly flat roof or one that is pitched to a desired extent may be produced. The membrane acts to temporarily protect the foam, gives it smooth surfacing and makes it readily capable of being coated or taking other permanent finishes or paints. However, if desired, the membrane may be removed and the foam may then be directly coated or otherwise treated. All these advantages are obtainable by an efficient and economical process which may be effected by means of an automatic or semi-automatic foam applying apparatus of this invention.

In accordance with the invention there is provided an apparatus for in situ preparation of a foam-membrane sandwich having an upper surface of controlled smoothness, thickness and pitch and application thereof to a surface to which it is to be firmly held which comprises means for depositing a fluid, curable pre-foam of a rigid polymeric material onto the surface and means for laying the membrane above the curable pre-foam a controlled distance away from the surface or at a controlled pitch so that the pre-foam may contact the membrane and bond to it, whereby the surface of the foam is smoothed and the thickness or pitch of the applied foam is controlled. In preferred embodiments of the invention the apparatus is self-propelled, automatically advancing continously or after a sufficient amount of foam-membrane sandwich has been produced, is reversible, includes means for applying a polyurethane pre-foam together with a flexible membrane cover which is preferably a roofing felt or a fiberglass web, mat or cloth, has automatic means for adjusting the height of the sandwich or the pitch thereof (or both) and contains means for assisting in raising most of the machine out of contact with a supporting surface so as to facilitate turning it horizontally and positioning it for operation. Also within the invention are processes for the in situ preparation and application of the described foam-membrane insulating sandwich which include depositing the fluid, curable pre-foam of rigid polymeric material on the surface to which it is to be applied and between it and a membrane, while holding the membrane away from the surface but in such position that the pre-foam contacts the surface and the membrane, and moving forward on the surface the locus of application of the pre-foam while maintaining a portion of the continuous membrane above the pre-foam being deposited and in contact with it. Preferred processes are analogous to preferred apparatuses previously mentioned.

The invention will be readily understood from the following description of a preferred embodiment thereof, taken in conjunction with the drawing, in which.

A semi-automatic apparatus 11 for applying a foam-membrane sandwich 13 having an upper surface of controlled smoothness and thickness or pitch is shown in the drawing in operating position on the surface of a roof 15 to which such a foam-membrane sandwich is being applied. As illustrated, the machine is in position to begin the application of the insulating sandwich to the roof and therefore, one side thereof, the right side, considering the direction of motion of the machine, indicated by arrows 17, 19 and 21, is resting atop rail 23, which is of a thickness corresponding to the desired height of foam-membrane sandwich to be applied to the roof.

Although roofing apparatus 11 may be manually propelled along the desired path, preferably it is motor driven by pneumatic, hydraulic or electrical means, with the first being preferred and being illustrated herein. To most simply state the function of the apparatus, as it advances in the direction of arrows 17, 19 and 21, a fluid polyurethane or other suitable polymeric pre-foam 29 is deposited on surface 15 while membrane 31 is fed from feed roll 33 and is positioned a desired distance, e.g., ½ to four inches, preferably ¾ to three inches, above the roof surface 15 where the pre-foam is being applied, thereby confining it within a moving form which may be considered to be defined by rail 23 or a previously laid down membrane-covered foam deposit or run, not illustrated, membrane 31, roof surface 15 with the near edge 13 open but maintained at a controlled distance above the original deck surface to permit free extrusion of excess pre-foam to that side.

The pre-foam is preferably a polyurethane pre-foam, in fluid form, capable of being "extruded" to the open portion of the "form" opposite the rail or previously laid down run or track of cured foam but other foams, such as are described in the Modern Plastics Encyclopedia, Vol. 50, No. 10A (1973–1974) at pages 125–150, may also be employed, plus other polymers in foam form, such as those characterized as polyesters and polyethers. The MPE publication is hereby incorporated by reference. A preferred foam system is the two-part urethane system identified as NB-45 of the Dumont Chemical Corporation, 2126 East 33rd Street, Erie, Pa., with ½ to 4%, e.g., 1.3% addition of Propellant 12 or R-12 (dichlorodifluoromethane). Suitable other components of the system include R-11, silicone cell modifier, metal or amine catalyst and other usual polyurethane system ingredients. Another useful foamed fire-retardant polyurethane system, sold by Owens Corning Fiberglas Corp., is marketed as their spray system 322 (25 flame spread).

In making polyurethanes a fluid reacting pre-foam is made by mixing together, usually after heating, individual streams of isocyanate, such as Papi 135 (polymethylene polyphenyl isocyanate) manufactured by the Polymer Chemical Division of The Upjohn Company; Mondur MR (Mobay Chemical Corporation) or other polymeric isocyanates based on diphenyl methane diisocyanate (crude MDI), and polyethers made by the reaction of polyfunctional alcohols with propylene oxide and/or ethylene oxide, although reactions may also be between the isocyanate group and an active hydrogen supplied by an amine. For rigid foams, the highly preferred foams utilized herein, it is often preferred to utilize polyols which are either polyethers or polyesters, such as the polyethers formed by the reaction of ethylene oxide and/or propylene oxide with trimethylol propane, sorbitol, sucrose, pentaerythritol, glycerol and/or aliphatic and/or aromatic amines, and the isocyanate most generally used is a polymeric form of MDI, although other known isocyanates and mixtures of these are operative, too. Note that the polyols employed are of low molecular weights and generally have a degree of functionality of at least three.

The pre-foam components separately pass from pressurized or other supply means, such as may be on a truck, not shown, for polyurethane "spray" applications, through metering and pre-heating means, not shown, through lines 37 and 39 for the isocyanate and resin, respectively, both of which lines are enclosed in a protective foam supply hose 41, then through a heater 43, which may be provided for adjusting the temperature of the reactants to a suitable point so that the cure will be effected in a desirable time, then through lines 44 and 45, respectively, and foam hose 47 to foam gun 49, wherein the pre-foam reactants are mixed and pre-foam resulting from said mixture is discharged under the membrane being laid down to produce the foam-membrane sandwich. Thus, at the time of application of the fluid pre-foam it is confined in the molding form, minimizing overspray and carrying away of the foam deposits which could otherwise cause damage to nearby parked cars, buildings, etc., especially on windy days. The foam quickly cures in place to form a rigid foam-membrane sandwich, which is capable of supporting the foam applying apparatus during use.

Figure 3:
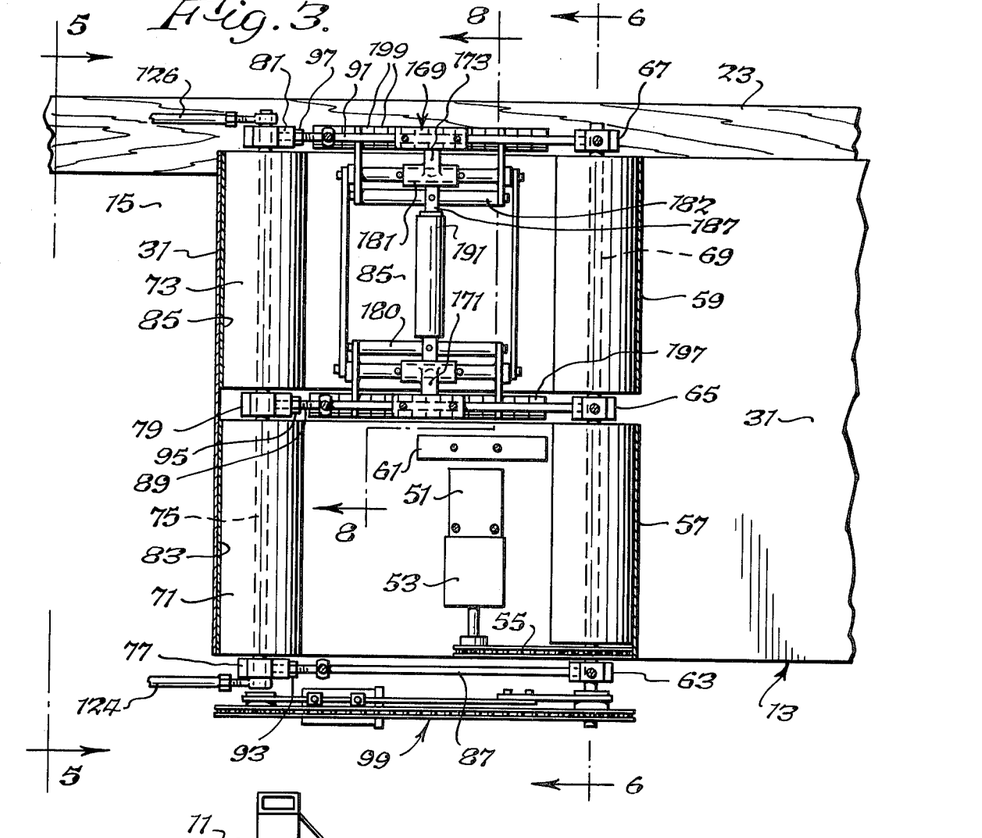
FIG. 3 is a plan view substantially along plane 3—3 of FIG. 2.

As is seen best from FIG. 3, a driving motor 51, herein illustrated as a preferred reversible air motor, transmits its motion through speed modifier 53 (usually a speed reducer) and a suitable drive means 55, herein illustrated as a chain drive, to drive rollers 57 and 59. Solenoid valve assembly 61 is provided to control the flow of air to air motor 51 to allow for reversal of the direction of movement of the apparatus. Drive rollers 57 and 59 are supported on bearings 63, 65 and 67 which support the roller shaft 69. Similarly, "idler" rollers 71 and 73 and the shaft 75 thereof are supported on bearings 77, 79 and 81. Continuous belts 83 and 85 are mounted under tension on the respective rollers, with means for tensioning the belts being provided, comprising threaded connecting shafts 87, 89 and 91 and nuts 93, 95 and 97, respectively, for adjusting interroller distances.

A membrane alignment adjustment means is provided 223 on one feed roll trunnion to insure that the feed web is properly centered on idler rollers 71 and 73.

When the apparatus for applying the pre-foam is moving forward it is seen that membrane 31 will be withdrawn from roll 33 and will be held flat by belts 83 and 85. Belt 85, held in place by rollers 59 and 73, rests on rail 23 to adjust the right hand height thereof and the height of the membrane when moving in the direction of arrows 17, 19 and 21, the left rear portion of belt 83, under roll 57, rests on the already laid membrane foam sandwich but the left forward side of belt 83, under roller 71, unless otherwise supported, rests on roof 15. To adjust the height of membrane 31 at the left forward portion thereof, as it is held against roller 71, there is provided a vertically adjustable bogie 99 of chains, belts, wheels, skids, rolls or other devices, which raises the free or left edge of the front roller a desired clearance distance to produce a sandwich of specified insulation thickness. As illustrated best in FIG. 7, bogie 99 includes continuous chain supporting means 101 mounted on, around and between driving sprocket 103 and drive sprocket 105. The chain is kept under tension by action of turnbuckle means 107 and arm 109 which moves to tighten the chain when the turnbuckle is tightened, at which time arm 109 turns about pin 111. Bogie frame member 113 is connected with the main frame 115 through connecting rods 117 and 119, the former being controllable in length (height) by leveling air piston-cylinder assembly 121 and the latter being controllable by corresponding hydraulic locking piston-cylinder assembly 123. If desired, instead of the leveling and locking piston-cylinder assemblies, screw adjustment or other height adjusting means are employed, the left front of the frame and with it the left front portion of roller 71 is raised a desired but fixed height above the roof level. By locking the hydraulic piston-cylinder assembly in position a similar effect is obtainable. Thus, the left forward portion of the bogie chain will support this one otherwise unsupported corner of the apparatus and maintain the desired position of the membrane and thickness of the insulating membrane-foam sandwich laid down. It does this because there is held above the roof-contacting point of the bogie chain the apparatus frame 115 and bearing 77, held to the frame, in which bearing shaft 75 turns and about it rollers 71 and 73. Of course, if desired, both bogie chain sprockets 103 and 105 could be moved vertically to set the foam height but it has been found to be easier and more accurate and therefore, preferable to adjust only the leading sprocket, allowing the bogie to be driven on the roof surface.

With the height of the membrane held the desired distance above the roof surface as the foam applying apparatus advances, fluid pre-foam is produced by the mixing of the foam components or feeds in mixing nozzle or foam gun 49. Such foam guns are well known and are normally manually employed for spraying or depositing polyurethane foam mix onto roofs or other surfaces to be insulated. Such a foam mixing apparatus may be of the type shown in U.S. Pat. No. 3,263,928 and preferably there is employed a Gusmer Model D gun with a No. 70 mixing chamber (Gusmer Corporation, Old Bridge, N.J.) or equivalent foam apparatus. Such a gun is usually air actuated, being normally spring loaded with the valves thereof shut and actuatable by a trigger or other means which opens an air supply valve to actuate the foam gun valves and permit the discharge of a mixed pre-foam components stream. Although the foam could be sprayed or directed to the "nip" area between the membrane on the roller and previously applied foam, and onto the roof or other surface to be insulated, by application to a single location thereon, it has been found to be much more preferable to apply the foam by moving the foam gun transversely to the path of the machine across almost the entire width of the path on which the foam is to be applied. Such application results in more even coating with the foam and does not cause any premature curing in certain locations which might otherwise bar extrusion of foam past the cured portion to the open end of the form defined by the roof, rail or previously laid down foam deposit and membrane.

To cause the pre-foam to be deposited evenly across the path chosen, foam applying apparatus hose 47 and the tubes contained therein are flexible and long enough to permit the foam gun nozzle to reach to the ends of its desired sweep. As is illustrated on FIG. 9, the foam gun 49, with discharge nozzle 118 aimed at the aforementioned nip, is mounted on a suitable traversing carriage 120, which in turn is mounted on a support bar 122 mounted on pivotable mounting rods 124 and 126, the height of which is adjustable by loosening or tightening holding lines 127 and 129. Roller bearings 131, 133 and 135 facilitate easy movement of the gun traversing carriage on the support bar. The carriage is joined at 137 and 139 to a reciprocating cable 141 which passes through a cable cylinder 143, in which is contained a piston 145 which moves inside the cylinder in response to air flow. A three way solenoid air valve 147 regulates the feeding of air to the cylinder, in response to actuation of a roller lever microswitch 149. Thus, when the gun moves to one side of the cylinder the microswitch is actuated, causing air to be fed to the opposite side of the piston and venting it from the side where it had formerly been present. When the piston then moves to the other end of the cylinder, causing the gun traversing carriage to reach the opposite end of its path, the microswitch and the three way solenoid air valve are again actuated, this time by reverse control means 151, causing the complementary venting and feeding of air to the reciprocating cable cylinder. In such manner the foam gun continually traverses the carriage, depositing pre-foam evenly on the surface being insulated. Of course, by adjustment of the air feed to the cylinder the reciprocation rate can be modified accordingly. The best adjustment of the cable, cylinder, actuators and microswitches is such that the reach of the gun at the open end is about 1 to 10 inches, e.g., 4 inches, short of the desired width so that the pre-foam is extruded that last small distance.

Although it is possible to move the present machine forward (or backward) manually it is highly preferred that the operation of the machine be semi-automatic or automatic and that self-propelling means, such as an air motor and speed reducer, for moving the apparatus both forward and backward, should be present. Similarly, it is also highly preferable that instead of depending on an operator to note when sufficient foam has been applied so that the machine may be advanced, this should be done by automatic means. Of course, the speed of the machine may be regulated so as to move it forward just the right amount continuously with a constant rate of pre-foam application. However, it is preferred to have means for detecting the "extrusion" of the foam to the "free" end of the "form" and upon the detecting device noting the presence of foam at such end, indicating that the form is full, signalling the self-propelling means and advancing the apparatus at least until the detecting device no longer "observes" the presence of foam at such "open" end. Such a detecting device may be of any suitable type, such as one which is thermal-, conductivity-, or photo-responsive to the presence of extruded pre-foam. As illustrated, there is employed a light source and a photoelectric cell to actuate the drive motor of the apparatus when polyurethane or other suitable foam is present at the open end.

Figure 6:
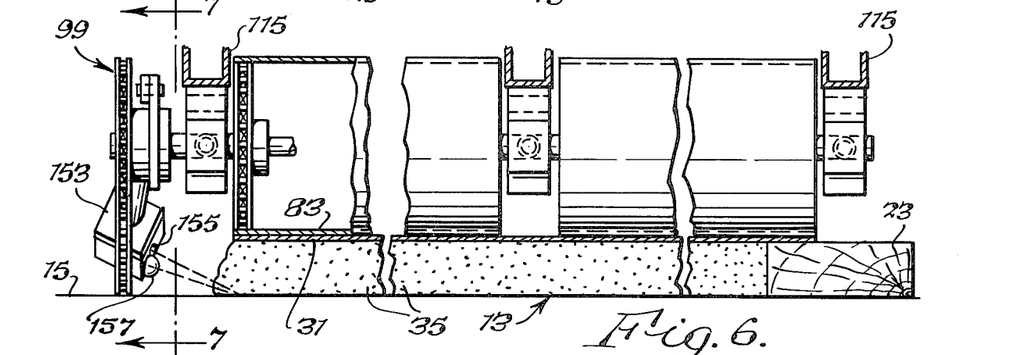
FIG. 6 is a partial vertical section taken along plane 6—6 of FIG. 3.
Figure 7:
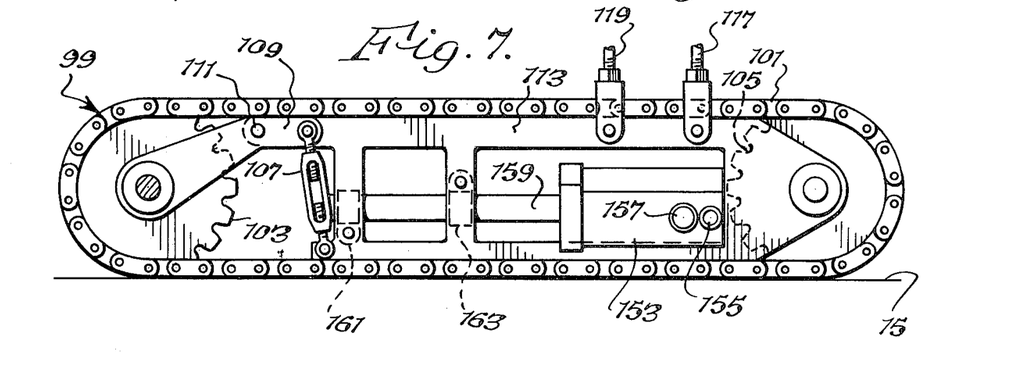
FIG. 7 is a partial vertical section taken along plane 7—7 of FIG. 6.

The operation of the foam-responsive advancing mechanism of the present apparatus is best seen in FIGS. 6 and 7. Holder 153 contains mounted therein lamp 155 and the holder and lamp are so oriented that the light from the lamp is directed onto the surface of polyurethane pre-foam extruded to the open end of the form so that the light is reflected from the foam back to a photoelectric cell 157, which, upon detection of the reflected light beam, actuates an air valve which moves the foam applying apparatus forward and, after the apparatus has moved forward enough so that the light is no longer reflected to the photocell, causes or allows the valve to close so that the forward motion ceases. The holder 153 is adjustable so as to be responsive to the reflected light at the desired extent of extrusion of the foam. Of course, when the foam is not extruded sufficiently, the light beam will not be reflected to the photocell and extrusion will continue until it reaches the desired position, whereupon the apparatus will be advanced. In some instances, rather than making the failure of the photocell to detect foam cause the stopping of the apparatus the apparatus will be automatically moved forward a given distance each time the photocell does detect the foam. This can be done by operation of a time delay solenoid or other equivalent means to allow a certain amount of air to enter the air motor each time the photocell is actuated and a microswitch is tripped, actuating the solenoid. In FIG. 7 holder 153 is illustrated on a carrier rod 159 which may be moved longitudinally to adjust the position of the light source and photoreflective detector. The rod, which is supported by mounts 161 and 163, is a conduit and contains the electric feed wire 165 to the photocell and lamp circuits and a signal wire from the photocell.

There was previously discussed the means for adjusting the height of one of the forward sprockets with respect to the corresponding roller so as to regulate the height of the foam sandwich being created. Such height is controllable by the leveling air piston-cylinder combination 121 and the related locking hydraulic piston-cylinder combination 123 previously mentioned. However, the apparatus performs special controlling functions with respect to height regulation or pitch regulation which were not previously mentioned and will be further detailed here. If all roofs or surfaces to which the present membrane-foam sandwich was to be applied were perfectly level or accurately pitched it is possible to permanently set the sprocket height with respect to the roller heights so as to deposit uniform thicknesses of sandwich on the surface. However, roofs are not perfect and consequently it is an advantage of the present apparatus that it can correct imperfections to produce smooth surfaced flat or intentionally sloped roofs. This is done to some extent by the chain feature which prevents the forward "outside" sprocket from dipping too deeply into holes in the roofs, which would cause severe irregularities to be preserved, rather than corrected by the machine. Nevertheless, if the roof is level or regularly slanted the present apparatus can be held at the desired height by means of the hydraulic locking cylinder 123, the height of which can be adjusted by allowing fluid to pass to either the top or the bottom portion of the cylinder, allowing a contained piston to move down or up, respectively, to the desired position, at which fluid flow is halted and the piston is locked in place. To make the apparatus automatically control the pitch at which the sandwich is applied, either building up or diminishing the sandwich thickness, as may be desired, a level detection and control device 167 is provided, which, as illustrated, includes a damped pendulum and means for actuating an air feed to the leveling air cylinder 121 in response to tilting of the pendulum to maintain the desired pitch or level despite roof or other surface irregularities. An adjustment is provided in the leveling device for positioning contacts of the pendulum controlling the means for feeding air to the leveling air piston, thereby allowing adjustment of the slope of the polyurethane applied. Instead of a pendulum there may also be used mercury tube switches and other means for regulating the desired pitch. Normally, while leveling, the hydraulic lock means 123 is relaxed but preferably after leveling it takes over the height control until the level detection and control device 167 is significantly actuated, this being done to prevent hunting and resulting irregularities.

Figure 4:
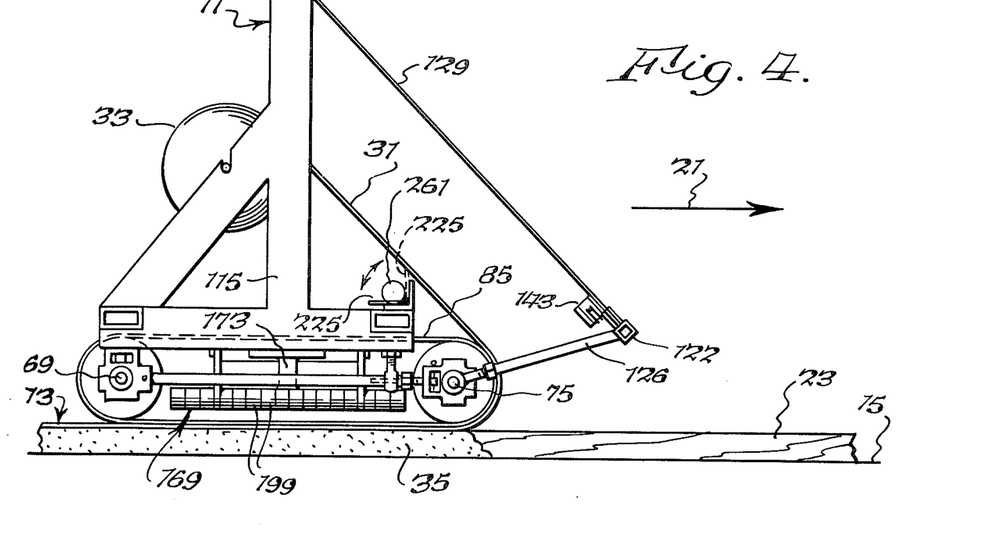
FIG. 4 is a rear elevational view of the automatic roofing machine, showing the side thereof hidden from view in FIG. 2.
Figure 5:
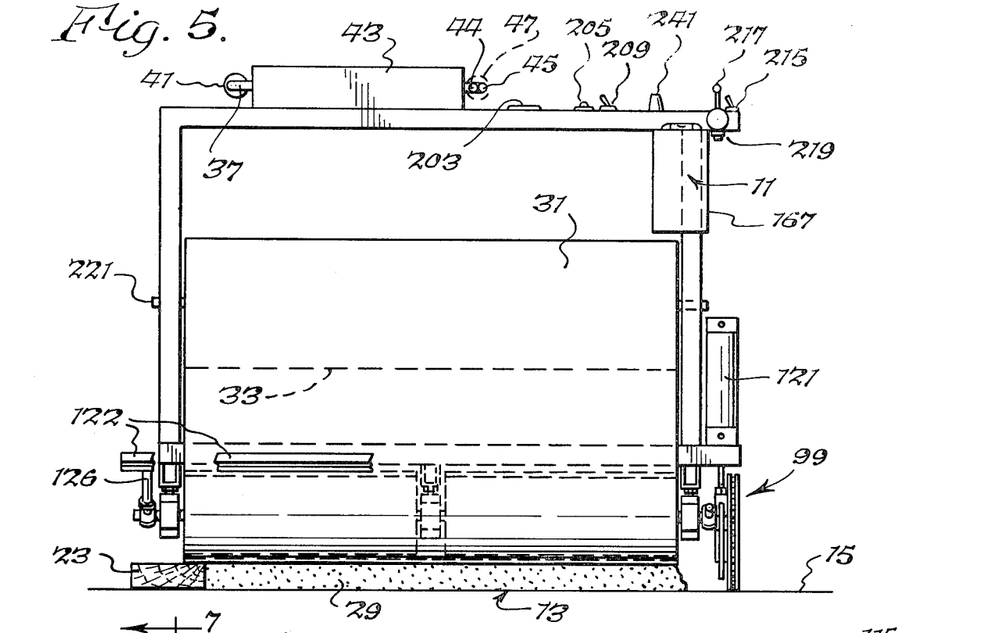
FIG. 5 is a side elevational view, looking at the forward part of the machine, which is the left side, as shown in FIG. 1.
Figure 8:
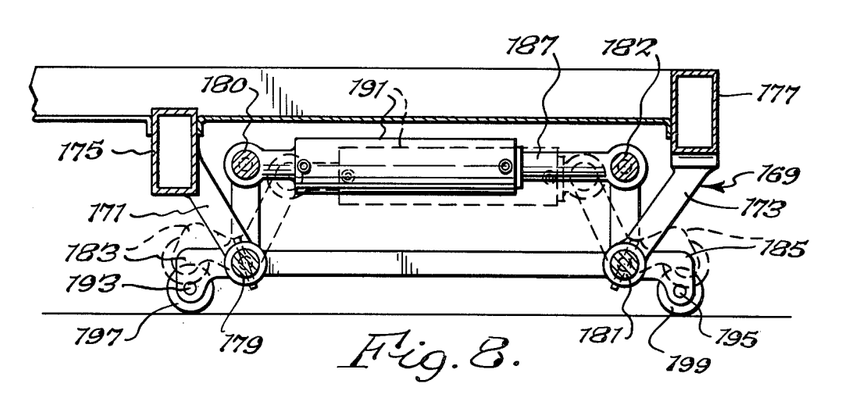
FIG. 8 is a partial vertical sectional elevational view along plane 8—8 of FIG. 3.

After application of a strip of membrane-polymeric foam sandwich to a surface the apparatus must then be moved to a new position so as to lay down the next strip. Such foam sandwiches are usually about 3 feet wide although strip widths may be varied, usually being within the range of 18 inches to 6 feet, preferably from 2 to 3 feet. The apparatus will be of considerable weight, usually from 100 to 1,000 lbs., frequently from 200 to 400 lbs., and because of the contacts of the belts with the membrane of the applied sandwich over considerable areas, the substantial weight of the apparatus and friction, it has been difficult to realign the apparatus for subsequent sandwich strip application. Accordingly, a lifting device is incorporated in the apparatus to raise it and the belts thereof out of substantial contact with the supporting surface and to facilitate turning and realigning for application of the next strip of foam. Such a lifter is illustrated in FIGS. 3, 4 and 8, with FIG. 8 best showing the operation thereof. Lifter 169 is mounted to frame 115 by affixation of rigid arms 171 and 173 of the lifter to frame members 175 and 177, respectively. Arms 171 and 173 each include pivot rods 179 and 181, respectively at lower ends thereof, and rods 180 and 182 at upper ends thereof, about which rods legs 183 and 185 turn in response to movements of piston rod 187 in or out of pneumatic cylinder 191. The cylinder also moves with the piston so that legs 183 and 185 move in essentially the same manner in response to piston movements. At the bottom ends of legs 183 and 185 are shafts 193 and 195, each which contains a series of rollers 197 and 199. It will be noted that when pressure is applied to cylinder 191 rod 187 moves outwardly, to the right in FIG. 8, lowering the rollers into contact with the supporting surface and raising the apparatus. Correspondingly, when the pressure is removed the rollers are retracted. In retracted position the two sets of rollers are located at the "closed" side of the apparatus and in the middle thereof, between the pair of belts, which pair of belts is so located as to provide clearance for the lifting rollers. In FIG. 8, as it is evident, the drawing shows the apparatus elevated and the phantom lines indicate the positions of the rollers, piston rods, etc., thereon, in retracted position.

After completion of the laying of the strip of membrane-foam sandwich on a roof it is a simple matter to pressurize the pneumatic cylinder, thereby placing the rollers in contact with the roof and raising the apparatus, after which it can be turned readily, with the plurality of rollers facilitating such turning. Note that in turning the machine some of the rollers on each of rods 193 and 195 will be moving in opposite directions, which capability facilitates placement of the machine in exactly the desired orientation. Retraction of the forward sprocket of the height adjusting bogie (FIG. 7) may be desirable during realignment of the apparatus.

Figure 1:
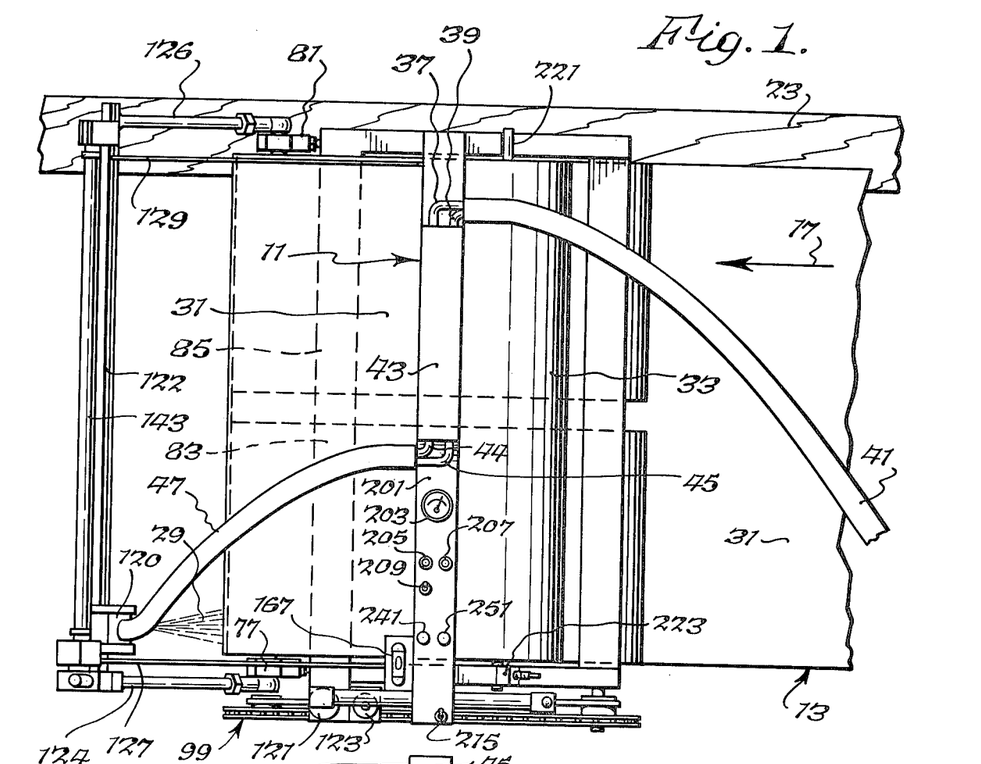
FIG. 1 is a top plan view of a semi-automatic roofing machine of this invention depositing membrane-covered roofing foam while moving forward toward the left of the figure.

In addition to the main features of the invented apparatus already described, it includes various additional elements and structures intended to facilitate most efficient operation thereof in depositing covered insulation on roofs. In FIG. 1 there is shown atop the frame and alongside the heater an instrument panel section 201 of the frame top which includes air supply pressure gauge 203 which indicates the air supply pressure for use in the leveling device (leveling air cylinder-piston combination), air motor, reciprocating piston-cylinder combination for causing transverse motion of the foam gun, the foam gun, knife and apparatus lifter. Such air may also be used for feeding the isocyanate and resin components of the foam to the foam gun. Signal lights 205 and 207 are to indicate operation of the heater and readiness of the foam (desired pressures), respectively. Selector switch 209 allows the selection of thickness control or level control. Vernier valves 241 and 251 are for regulating the speed of the reciprocating mechanism for moving the foam gun and for controlling the travel of the main apparatus, either forwardly or backwardly, respectively. Switch 215 is a three position (forward, automatic and reverse) manual switch for the apparatus movement.

Figure 2:
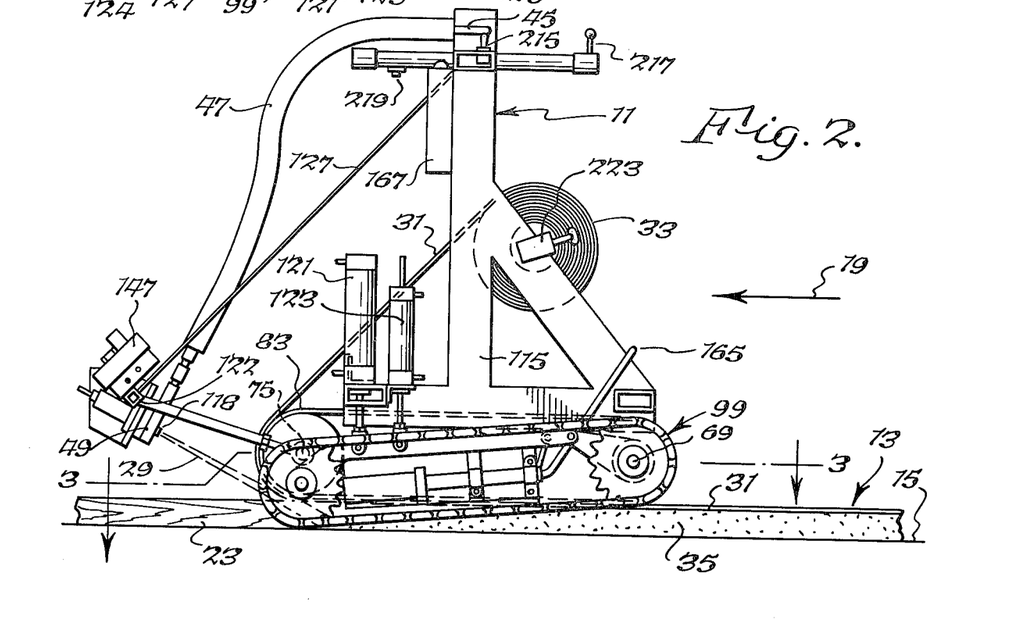
FIG. 2 is a front elevational view (left side, when considering normal apparatus motion) of the automatic roofing machine of FIG. 1.
Figure 9:
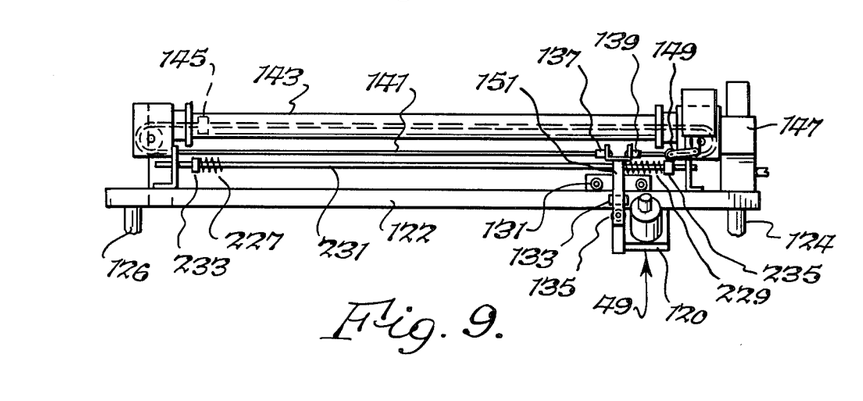
FIG. 9 is a side elevational view, looking at the front or left side, as shown in FIG. 1, of the foam gun and means for support and reciprocation thereof.

In FIG. 2 lifting control 217 is a three-way valve adapted to direct air into either end of cylinder 191 to move the piston therein, not shown, and at the same time to vent air contained in the opposite end of the piston. A manually held starting button 219 is provided to initiate the flow of foam and to start machine operation (except for forward or backward apparatus movement). As illustrated, the feed roll 33 includes a feed roll shaft 221 and an alignment adjusting means 223 for moving the shaft 221 for maintaining the desired alignment of the feed membrane to the front idler rolls. In FIG. 4 cut-off knife or blade 225 is shown positioned ready to be moved upwardly, when desired, to cut the membrane 31 near the end of a run of desired application of foam-membrane sandwich. The cut-off blade is preferably saw-toothed so that as the membrane is moved forward (to the right in FIG. 4) the points of the blade will penetrate the membrane and the blade will cut it, due to the membrane's forward motion with respect to the blade. Means, not shown, are provided for raising or lowering the blade. In FIG. 9 springs 227 and 229 on reverse control rod 231 serve to dampen the shock of contact of traversing carriage 120 with stops 233 and 235 and result in a more uniform application of the polymeric foam, due to the absence of irregular sprays or discharges from the foam nozzles which would otherwise result from the shocks of contacts with the stops at the ends of the traversing paths.

Other additional features of the invention include emergency stop means, not shown because the mechanism for operating it is self-evident, which cuts off all electric power and vents the air systems; membrane-responsive means, not shown, which includes a switch with an activating plunger which bears against the membrane 31 being fed from roll 33 and which stops the operation of the machine if the membrane has been broken or is not being fed; audible and visual alarms for indicating inoperativeness or incorrect operation of any of the elements of the apparatus; hook or eye means firmly joined to the main frame for the fastening of a lifting cable to raise the entire unit and place it on a roof where it is desired to employ the apparatus; and protective railings and bumpers on the apparatus to prevent damage to it by contact with obstructions or walls on roofs. Such additional parts of the apparatus are not illustrated because it is considered that their structures are clear from the present descriptions and in view of the complexity of the apparatus and drawings already, addition of further elements would only serve to obscure those already described, rather than to clarity the invention.

Figure 10:
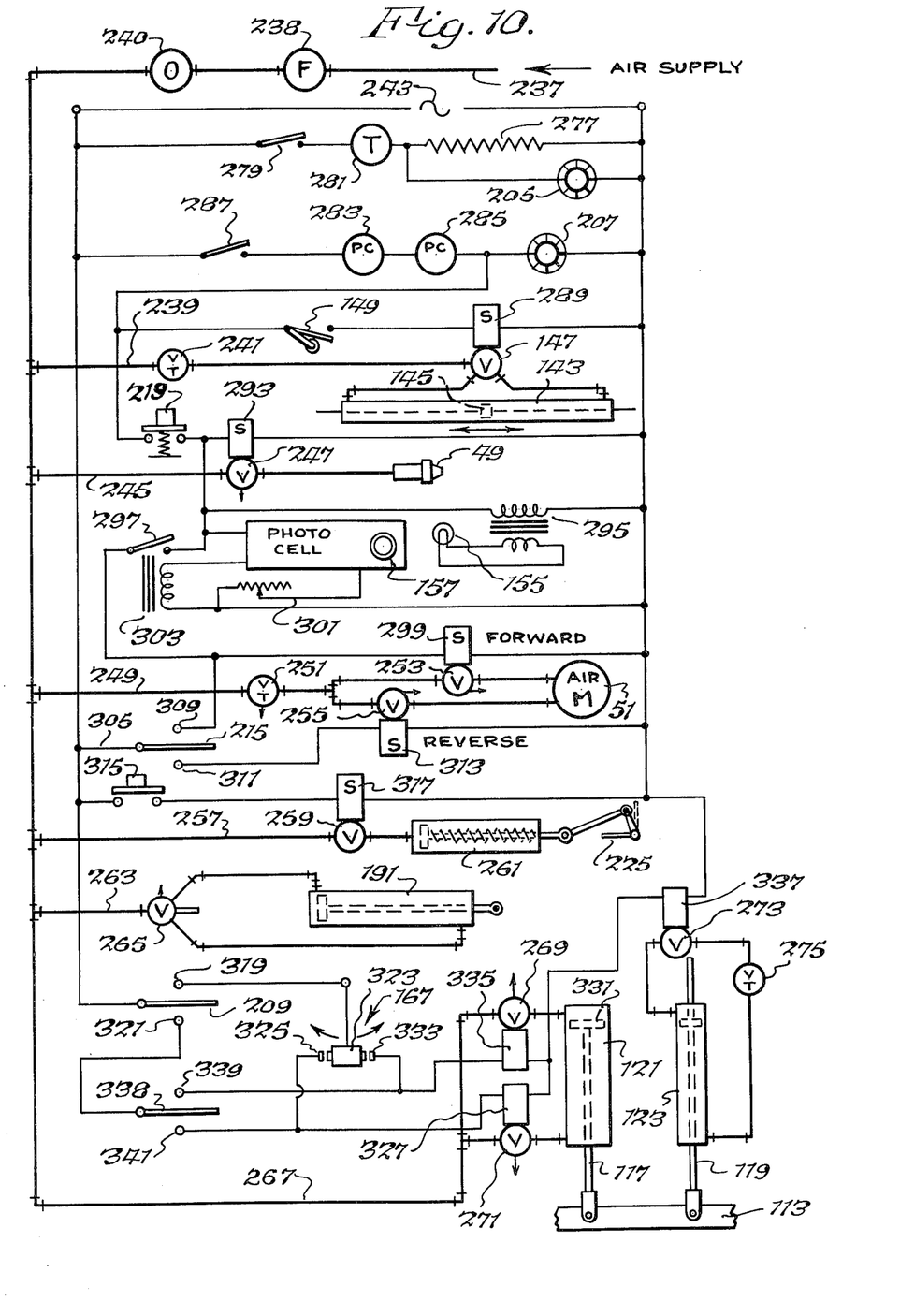
FIG. 10 is a schematic diagram of the various parts of the present apparatus, showing hydraulic, pneumatic, electric and mechanical components thereof.

In FIG. 10 are illustrated the pneumatic and electrical circuits for the apparatus, together with the hydraulic system and various controlled mechanical components of the apparatus. Air enters the pneumatic system at 237, passes through filter 238 and oiler 240 and then is supplied to the gun traverse circuit, the foam gun, the main carriage travel system, the membrane cutter or web cutter and the pneumatic pitch or thickness control system. Although various air pressures may be employed, normally the pressure will be between 50 to 200 lbs./sq. in., preferably from 80 to 120 lbs./sq. in. Instead of air, other gases may be used in the pneumatic system or analogous hydraulic, mechanical or electrical systems may be utilized but pneumatic controls are normally preferable. The electrical system is of 110–120 volts, preferably 120 volts, and 60 hertz but of course, 220 volts and other potentials may also be utilized and the frequency may be modified, although it will normally be in the 50–60 hertz range. Electrical supply 243 feeds the circuits previously described plus the various additional controls and indicating signal circuits and the hydraulic foam level locking control circuit.

Filtered and oiled air from source 237 is communicated through line 239, throttle valve 241 and solenoid-controlled 4-way valve 147 to the gun traverse circuit cylinder 143. Solenoid valve 147 admits air selectively to either side of piston 145 to cause the reciprocating action of a foam gun mounted in operative connection with the piston. The speed of reciprocation of the gun is controlled by adjustment of valve 241. Through line 245 from main air supply line 237 air pressure is transmitted to foam gun 49 via three-way solenoid valve 247.

Air motor 51, for operation of the forward and reverse main apparatus drives, receives air through line 249, throttle valve 251 and either solenoid-controlled valve 253, for forward movement or solenoid-controlled valve 255 for reverse movement. Throttle valve 251 controls the speed of travel of the apparatus. Solenoid valves 253 and 255 are part of solenoid valve assembly 61, illustrated in FIG. 3, and both are three-way valves, so as to be able to exhaust air, too. Pneumatic lines 257 transmits air power through solenoid-controlled valve 259 to web cutter 225 which is actuated by piston-cylinder combination 261.

Line 263 carries air from main air supply 237 via manual three-way valve 265 to either end, selectively, of pneumatic cylinder 191 for actuating the apparatus lifter 169. The pneumatic pitch- and level-control piston-cylinder combination 121 receives air through line 267 through either of solenoid-controlled valves 269 and 271, each of which is a three-way valve having venting capability.

In some embodiments of the present invention, not illustrated herein, steering control is effected, preferably by pneumatically controlled braking of either of belts 83 and 85, by the braking of one of the drive or driven rollers. Also, an emergency braking system may be included in the apparatus although, as illustrated, provision is made for emergency braking by cutting off the air supply to the air motor or by reversing the direction of such supply so as to reverse the movement of the apparatus. Release of button 219 halts machine operation.

The apparatus hydraulic system, as shown, is limited to the locking level and thickness control circuit or assembly 123. The hydraulic system, a small closed circuit, includes a solenoid-controlled valve 273, a throttle valve 275, assembly 123 and communicating lines between them.

In the description of the electrical components of the apparatus wires will not be referenced because it is clear from FIG. 10 which wires are being referred to and it is considered to be unnecessary to identify them further. From electrical supply or source 243 optional heater apparatus 43 is heated by a resistance heater 277 when switch 279 is closed. Temperature control 281 automatically turns the heater on and off, thereby maintaining desired temperature. Signal lamp 205 is lit when the heater is operating. In a foam supply or ready circuit pressure controls 283 and 285 allow the passage of resin and isocyanate respectively, to the foam gun when these feed components are at the desired pressure and when web continuity switch 287 is closed, by contact with the membrane being fed from roll 33 over rollers 71 and 73. If the web is discontinuous switch 287 opens and no electricity is supplied to the foam gun and gun traversing circuits. When switch 287 is closed and foam component supply pressures are satisfactory ready lamp 207 lights, signalling readiness for operation. When the pressure is satisfactory electricity is carried to reversing switch 149 which actuates solenoid 289 to operate valve 147 and cause the traversing carriage of the foam gun to operate. Also, when foam switch button 219 is depressed solenoid 293 opens or closes gun valve 247 to permit the feeding of foam from gun 49.

When switch button 219 is depressed the switch closes and must be held closed during foam operation to provide "dead man" control, turning on the foam gun through solenoid 293 and also transmitting electricity to transformer 295 where it is converted to 12 volts and used to supply lamp 155 which illuminates the foam edge, activating photocell detector 157 when the foam has been extruded to the edge of its desired travel. When the photocell detects the presence of the reflected light it operates relay 303 which closes switch 297, allowing electricity to flow in a complete circuit through solenoid 299 to open valve 253 and permit air to flow to air motor 51, moving the apparatus fowardly. An adjustment 301 is provided for desired regulation of the sensitivity of the photocell so that it responds satisfactorily to the presence of the foam at the extruded end of the form.

From source 243 electricity is also passed via line 305 and two-way switch 215 which makes contact at contact point 309 or at contact point 311 or remains open, as desired. When contacting point 309 solenoid 299 is activated, valve 253 is opened and air motor 51 is driven in a forward direction. When the contact is with point 311 solenoid 313 is actuated, opening valve 255 and reversing the flow of air to motor 51. Thus, the apparatus can be moved forward or backward without operation of the foam applying means or, when switch 215 is in the open position and foam is being fed, the apparatus may be moved forward with electricity being conveyed to solenoid 299 to open valve 253 and pass air to the motor 51, due to the operation of detector 157 and relay 303. Additional relays may be employed as required to avoid undesired circuit interactions.

Switch 315, when closed, activates solenoid 317 which operates pneumatic valve 259 to deliver air to piston-cylinder assembly 261 and move cut-off blade 225, causing the blade to cut off the web when desired. Valve 265 for the apparatus lifting device is indicated as being hand operated but may also be operated by means of a switch and an associated solenoid control, not illustrated.

Selector switch 209 is for level or pitch control, when moved to upper position at contact 319, or for thickness or height control of the foam-membrane sandwich when moved to lower position at contact 321. If set for pitch control electricity is communicated to level or pitch detection and control device 167 which is of the pendulum type as illustrated. When the pendulum is adjusted to the desired pitch and the machine is operating the pitch will be maintained without need for any adjustment as long as the front left portion of the chain does not dip or rise, due to any surface irregularities. Should the chain dip the pendulum 323 contacts contact point 325 and transmits electricity to solenoid 327 which actuates three-way valve 271 to move piston 331 in leveling device 121 upwardly, as shown, to maintain the desired level by applying a thicker layer of foam. Conversely, if the forward left portion of chain 101 is elevated by contact with a bump in the roof or other raised surface, pendulum 323 will swing backwardly, making contact with contact point 333 and causing electricity to flow to solenoid 335, which actuates valve 269 and causes piston 331 to move downwardly. Pendulum assembly 167 can be set for the desired pitch, with the foam being pitched upwardly, downwardly or perfectly level across the path of deposit. Whenever solenoid 327 or solenoid 335 is activated, electricity will flow to solenoid 337, which will open valve 273, allowing hydraulic fluid, confined in a circuit with piston-valve assembly 123, to pass between top and bottom of the cylinder through throttle valve 275. Thus, the hydraulic piston will move in concert with the pneumatic piston, will dampen movement of the air piston and will lock the vertically adjustable bogie 99 at the desired heights for application of foam until the apparatus presses the hole or bump and until another depression or elevation is encountered. It has been found that the use of the hydraulic means is desirable because of the tendency of pneumatic means to fail to lock in place because of compressibility. For thickness control and adjustment switch 338 may be employed to pass air and liquid to the upper or lower portions of the pneumatic and hydraulic chambers, respectively, thereby adjusting the height of bogie 99 with respect to frame 115 and thus regulating the foam-membrane sandwich thickness. In the upper position, at contact 339, the thickness is being increased whereas at the lower contact point 341 it is being diminished. Between the contacts the thickness adjustment is locked since valve 273 is closed.

Of course, although various mechanisms for operating particular parts of the apparatus have been described above, variations thereof and different operative means may also be employed. For example, in some embodiments of the invention instead of using solenoid operated valves, hydraulic or air operated valves may also be useful. Instead of employing pneumatic motor or piston-cylinder drives, electric motors or liquid-powered motors may be used. Similarly, mechanical devices such as springs may take the place of some of the driving means herein described. Nevertheless, the described structures have been found to be very satisfactory and are considered generally superior to the mentioned variations thereof.

For clarity some elements of the apparatus have not been described in the "circuit diagram" of FIG. 10 and in some cases other elements omitted from the various other figures have been shown in FIG. 10. This was done to clarify exposition of the invention and it is considered that the structures are evident to one of skill in the art from the descriptions given.

The described apparatus is useful in field application of a "floated" monolithic polyurethane foam insulation on generally horizontal surfaces, such as roofs or floors, to produce a controlled thickness and/or slope of roofing material with a smooth top surface. Such a surface coating, usually about one-half to three or four inches thick, may be employed to prevent undesirable energy transmission tnrough the insulated surface, to correct leakage and drainage problems and to avoid condensation and other moisture problems common to conventional insulation systems. There are no panel joints which are locations where membranes covering insulation often rupture, causing leaks and allowing saturation of the insulation, with resultant loss of insulating ability and damage to the premises.

When the apparatus and method of this invention are not employed for the deposition of polyurethane and similar foams onto roofing or other structures, foam oversprays limit application to certain locations and low wind conditions whereas with the present apparatus such limits are not controlling. By use of the simultaneous membrane application, in addition to confining the foam and preventing undesirable oversprays thereof, the membrane produces a smooth upper surface and is of uniform thickness or slope, as desired. The polyurethane foam cannot readily be made uniform by conventional means, as by doctoring or screeding the surface to control thickness and smoothness, because although the polymerizing mass or "pre-foam" is relatively fluid and mobile before curing it is also very tacky and the gas bubbles therein are easily ruptured. During curing or solidification the discharged pre-foam may expand to a volume as much as thirty times the original volume, usually due to vaporization of the low boiling dissolved material therein, such as trichlorofluoromethane and/or dichlorofluoromethane to form a closed cell polymeric plastic of low density and thermal conductivity and of surprisingly great strength. The polymerization, from mixing of the two liquid reactants or foam components to setting so that the foam can support the foam applying apparatus, may be only a matter of seconds, e.g., from 1 to 30 seconds, usually from about 2 to 10 seconds. The volume expansion is normally from 5 to 30 times, preferably from 10 to 20 times, but other expansion rates are also useful. The final density of the foam will usually be in the range of from 1½ to 10 lbs./cubic foot, preferably 2 to 5 lbs./cu. ft. and most preferably 2.5 to 3.0 lbs./cu. ft. The rigid polyurethane and equivalent polymeric foams made normally have $k$ values ($k$ = thermal conductivity = heat (B.t.u.) transferred per hour through a one inch thick, one square foot area of homogeneous material per ° F. of temperature difference from surface to surface, the units being (B.t.u.) (in.)/(hr.) (sq. ft.) (° F.) from 0.08 to 0.25, preferably about 0.1 to 0.2. Such polymers, if of polyurethane, can withstand temperatures of at least 250° F. in normal application and use. Thus, short term exposure to the hot bitumen of conventional built-up roofing, which may be applied atop of the membrane of the insulation, can be withstood, especially if the upper surface is protected by an impregnated membrane.

In application at the nip of a roll of suitable membrane material, as it is rolled onto the substrate to be insulated, the urethane pre-foam first expands upwardly from the substrate, lifting the membrane into contact with a generally horizontally disposed flat plane formed by belts or platens or other means for restraining the upward rise of the membrane. Further expansion of the fluid foam moves it laterally into contact with one side of the cavity, the rail or previously laid down side, which is closed, so when expansion is complete to such side excess fluid pre-foam extrudes from under the opposite free edge of the membrane. Thus, when the forward motion of the present apparatus is controlled to hold this free edge extrusion fairly constant, complete insulation fill under the membrane is assured. This permits accommodation to various insulation thicknesses specified and to irregularities in the desk surface, such as flutes or corrugations. Further, a controlled directional pitch can be given to the top surface, permitting correction of ponded areas on roof decks and insuring subsequent proper drainage.

During use of the apparatus, as the membrane material is fed from the feed roll, feeding around and under the front roller and passing under the "supporting" belts, it prevents the tacky fresh foam from adhering to the leveling belts. Of course, the feed roll and the rolls which move the leveling belts are aligned and the roll feed is centered with respect to the belt rollers. In normal application of the pre-foam to the nip between the roof and membrane the foam nozzle moves parallel to the front belt roller and is aimed so that the mixed pre-foam stream is directed just below the tangent of the front roller and the membrane and against the substrate. There is some splashback against the underside of the membrane. The foam injection is thus closely confined and overspray is diminished by the shielding membrane, rail and laid down foam. The surface hills and valleys, nearly inevitable when polyurethane is applied by hand, are eliminated and this allows the use of a lesser quantity of weather protecting material than would otherwise be required for hand sprayed foam surfaces.

Control of the thickness of foam sandwich applied is obtained by starting the confined edge of the machine along a base, rail or ground strip, on the perimeter or centrally located on the surface to be coated and extending above the surface the required thickness of the insulation. As has previously been described in detail, the opposite or free extrusion side of the machine is supported by a vertically adjustable bogie to give the required clearance under the membrane for application of the foam. After an initial strip of foam is laid, adjoining passes are gauged with the confined sides of the machine supported on the free edges of the original strips of membrane-insulation sandwich, slightly overlapping these. The originally laid foam is somewhat irregular or scalloped in appearance at its "free end" and thereby an excellent locking of the later laid strip with that first deposited is obtained.

In normal operation the membrane-foam sandwich is laid about the perimeter of a roof or other surface or of a selected area thereof, with succeeding membrane strips overlapped about 1 to 6 inches, preferably about 1½ to 3 inches on a previously laid strip which serves as an edge thickness guide. When the leveling or thickness bogie is on the left side of the machine the direction of travel is counterclockwise, starting the length of the belt centers from one corner and completing the strip at the far end of the roof area. The machine is then backed up slightly, lifted by the lifting means previously described, pulled the width of the membrane toward the operator, turned counterclockwise 90° and pushed sidewardly into alignment with the next edge, after which it is backed onto the just completed strip in the corner. The membrane is then pulled down under the front roller, overlapping the left edge of the previously completed strip. After checking alignment the machine is started along the second side of the roof perimeter, completing it at the next corner where the turning and realignment procedure is repeated. Such operations are continued until covering of the roof has been completed. If the overlap distance is changed significantly due to initial misalignment or for other reason, the membrane may be cut, the machine backed up and realigned and restarted with suitable membrane overlap at the cut end. Alternatively, steering means may be utilized to correct the misalignment. In some cases a center strip may be used as a starting guide, in which case the confined side of the machine is aligned on the center ground and the machine is moved to the far end of the roof or surface to be coated, where it is backed up, turned 180° clockwise, aligned to about a two inch overlap on the center ground and another strip of foam-membrane sandwich is applied. Parallel strips may be applied in this manner until the roof has been covered. In either of the described operations it is desirable to reduce the width of foam gun travel on the last few strips applied to avoid excessive overlap or pile-up of foam.

When interruptions are encountered on a roof such as stacks, vents, skylights or roof-mounted equipment, the foam applying machine is stopped and the membrane is cut and broomed down flat at the obstruction. The machine is then realigned to produce a cross strip of appropriate length at a right angle or a suitable angle behind the obstruction, using a portable rail for height adjustment. Then the area around the obstruction can be hand sprayed to specified thickness by removing the foam gun from its reciprocating carriage and the area may be hand trimmed or sanded to a smooth plane even with the machine laid foam insulation surface and the membrane may be applied. The machine is then realigned on the cross strip in the direction of original motion and work is continued.

Because membrane materials such as roofing felt are normally available in rolls of 36 inch width in the United States and Canada the preferred apparatus of this invention is designed to accommodate such membranes with the level restraint being applied over substantially this entire width, although the machine can be designed for other widths, such as 1 meter. Because realigning the machine at roof corners involves starting the next strip across the end of the previous strip the parallel belt rollers are preferably located on about 24 inch centers to permit convenient feeding and lapping of the next membrane, using the 36 inch membrane width, although other center distances may be desirable with different membrane widths. The leveling restraint is thus applied to about six square feet so that a toal weight of the machine, including the membrane roll, of about 250 to 500 lbs. produces a vertical restraining force of about 42 to 84 lbs./sq. ft.

The foam system employed preferably incorporates a catalyst, such as a metal or amine catalyst, and blowing agent so that the combination thereof is capable of substantially complete expansion and initial curing within 2 to 30 seconds, most preferably about 2 to 6 seconds, so as to permit a sufficiently fast and economical machine advance speed. When the foam thickness applied is under 1½ inch, it is often desirable to increase the fluidity of the pre-foam by a "frothing" technique, employing controlled addition of about ½ to 4%, on a liquid volume basis, of an auxiliary low boiling blowing agent such as dichlorodifluoromethane to the foam system to produce fast expansion and lateral spreading of the pre-foam and raising thereof against the restraining forces perpendicular to the substrate. Some unrestrained expansion of the foam after passage of the apparatus is permissible but normally significant amounts of such expansion are avoided. However, if there is such post-expansion it may be compensated for by an appropriate reduction of the restrained thickness at which the foam is laid down.

The expansion or rise and the tack free or set characteristics of the foam system should be appropriate to the thickness and the ambient temperature of application and it is desirable that the foam system be designed for use with or without a low boiling propellant such as R-12. Because a fan spray pattern is unnecessary in the present operation it is usually desirable that the foam ingredient feed temperatures should be slightly lower than those normally employed, to minimize possible overspray. A slightly slower resultant foam activity is compensated for by better retention of the exothermic heat of polymerization under the membrane and intimate contact between fresh pre-foam and the already reacting pre-foam in the cavity or form under the membrane.

While other foam systems and foam equipment can be satisfactorily employed excellent results have been obtained using the previously mentioned Dumont NB-45 foam system with ½ to 2% R-12 addition in a Gusmer Corporation Model FF Foam Machine with the Gusmer Model D gun and a No. 70 mixing chamber at a gun pre-heater setting of 100 to 120° F., a hose setting of 100 to 160° F., using 200 feet of three-eighth inch low voltage hose, and a foam delivery rate of about 7 to 8 lbs./minute. The foam deliveries may be from 2 to 40 lbs./minute, pre-heater settings may be from 90° to 180° F., hose settings may be from 60 to 160° F., and R-12 additions may be omitted. At the preferred conditions mentioned a 34 inch width of one inch thick foam is produced with a smooth top membrane surface at a forward advance rate of about 5 to 25 feet per minute, preferably about 10 to 15 ft./minute, producing about 20 to 100 sq. ft. of insulated deck per minute, preferably 25 to 50 sq. ft./minute. The normal foam metering and mixing equipment is designed for a substantially constant pre-foam delivery rate, which is typically from 5 to 25 lbs./minute. Of course, the forward advance of the apparatus is inversely proportional to the insulation thickness and width. Also, if corrugations, grooves or flutes or low areas in the deck to be covered are to be leveled by filling with foam the forward advance must be appropriately reduced. Whether or not such irregularities are present a void-free insulating fill of foam is signalled by the appearance of the foam extrusion at the free edge of the membrane at a point behind the front roller where the foam is approaching a non-fluid, fully expanded, tack-free condition. The forward advance can therefore be experimentally governed by visually regulating the forward speed to hold this foam extrusion fairly constant and at constant thickness and width. However, where variable thicknesses are required on uneven decks, to correct ponding or drainage problems and in similar situations, a variable rate of advance is required which is usually overly demanding of the operator's attention and therefore, the previously described automated control of forward advance is highly preferred. Because the extremely tacky nature of the fresh pre-foam precludes mechanical contact means for detecting edge extrusion or foam height to control forward rate of travel the lamp-photoelectric detection device previously mentioned or other suitable non-contacting means which is responsive to the presence of foam is utilized. The intermittent advance of the machine resulting leaves a slightly scalloped free edge, which is subsequently filled when the free edge becomes a confined edge of the next adjacent pass and which helps to lock the adjoining passes together. The forward travel feed of the machine is adjusted to be slightly faster than is required for deposition of the desired thickness or width. By such adjustment, the forward advance is automatically controlled even when the machine travels over a fluted or corrugated deck or a depressed ponded area which is being levelled. This higher speed also allows for depositing a tapered insulation of a design where the top surface is deliberately pitched toward or from the confined area, such as when correcting drainage problems.

After application of the smooth surface polymeric foam insulation it may be coated with built-up roofing, including alternating plies of roofing felt and bitumen and may be topped with a layer of gravel or aggregate. Methods of applying such built-up roofing are described in the text *Manual of Built-Up Roof Systems* by C. W. Griffin, Jr. published in 1970 by McGraw-Hill Book Company, at pages 75–103. Also of interest in the text is the chapter on thermal insulation, at pages 56–74, wherein the application of sprayed-in-place plastic foam insulation onto mineral fiberboard insulation is described.

Instead of applying built-up roofings, in some instances the membrane-covered insulation layer laid down may be covered with other coatings, including sprayed-on polymeric materials. It may also be removed, if desired, but in such cases normally the membrane will be specially chosen to be of low adherence to the foam and may be surface treated to inhibit adhesion. After removal of the membrane the foam may be coated directly with built-up roofing material or other substances.

Although the present apparatus is primarily for the controlled application of polyurethane foam insulation on generally horizontal surfaces such as roofs or floor decks, with minor changes in the means for supporting and advancing the apparatus by cables, chains, ropes or other means it is within the scope of this invention that it is adapted to foam-membrane applications on steep pitched roofs and similar surfaces, to domed roof structures, to vertical walls, such as cold storage structural walls, to cylindrical surfaces such as tank surfaces and to ceilings. It is considered that from the description herein the means for adaptation to such coating problems will be apparent to one of skill in the art. It is also within the scope of this invention to utilize the apparatus thereof for additional purposes, such as for the application of an adhesive and a web on top of it, and to applying adhesive along (without the web) and to applying bitumen, elastomers, polymeric foams, silicones, paints, finishes or other materials to appropriate surfaces for moisture transmission control, weatherproofing and other purposes, in closely controlled application amounts, by substituting a feed of such a material to a suitable spray gun on a traversing carriage. In all such applications the apparatus provides the advantages of close control of the covering thickness or weight applied and greater productivity, by elimination of operator fatigue together with the capability of shielding from overspray and minimizing of exposure of an operator to noxious or toxic fumes and droplets.

The following example illustrates the process aspects of this invention, using the described apparatus.

EXAMPLE

Utilizing the apparatus illustrated in the drawing, with standard weight saturated felt roofing (8 lbs./square in one case and 30 lbs./square in the other) of a 36 inch width, the machine is operated so that the traverse of the gun is 30 inches and a two-part polyurethane foam system, NB-45 (Dumont Chemical Corp.), with 1.3% of R-12 auxiliary blowing agent blended with the pre-foam reactants, is mixed in the mixing nozzle and discharged onto the nip area between the felt being applied and the roof so that a two-inch height of foam covered with the membrane is deposited. The electric supply for the machine is at 120 volts and 60 hertz and the air pressure supply is at 100 lbs./sq. in., with a flow rate capability of at least 2–3 cubic feet per minute. The pre-foam reactant tanks are each of at least 450 pounds capacity. Of course, to make the two inch height of foam a two inch rail is employed. The foam machine utilized is a Model FF Gusmer Corporation Machine and the foam gun is a Gusmer gun, Model D. The mixing chamber is No. 70 and the pre-heater setting is 110° F. with a hose setting of about 130° F., using 200 feet of three-eighth inch low voltage hose, delivering foam at a locus of points which move forward as the machine advances, at a rate of about 6.3 linear feet per minute. The foam produced is of a 1:1 isocyanate:polyol resin ratio by volume with amine and metal catalysts, R-11 blowing agent and silicone cell controller incorporated in the resin. For the isocyanate there may be employed Papi 135, Mondur MR, Rubicon Rubinate M or MDI. Various other polyol resins may also be used. When the foam thickness is diminished to one inch, the production rate is increased to about 12.5 linear feet per minute or about 36 sq. ft. of insulation per minute of a density of about 2.5 lbs./cu. ft., compared to about 6.3 linear ft./min. and 18 sq. ft./min. with the two inch thick insulation.

The apparatus automatically controls the height and maintains it level. When set for a slope of 178 inch per 36 inches, it automatically maintains such slope. At the end of travel the lifter is actuated, the machine is turned as previously described and is advanced along another rail at right angles to the first one in a counterclockwise direction. The roof is laid down in this manner, with previously laid strips being used as supports in place of the rails after the starting strips are laid. In another variation of the invention a center strip is used and parallel strips of foam are laid down. Similar operations are effected on slanted roofs, vertical walls and floorings. In place of polyurethane foams, other foams, such as epoxy foams and those previously mentioned are utilized, with fire-retardants added to them. Of course, special fire-retardants are also present in some of the polyurethane formulas utilized, e.g., chlorendic acid-based intermediates, antimony trioxide, bromine and phosphorus compounds.

Various modifications may be made in the equipment. For example, the cylindrical drive rollers may be replaced by a plurality of thin wheels pressing the belts downwardly and various special shielding means may be employed to protect the photocell against any stray light sources on especially bright days. Machine sizes and automation and control means may be altered and construction materials may be changed, as from steel to aluminum or stainless steel.

Utilizing the methods described, the controlled, even membrane-surfaced monolithic polymer foam of excellent uniformity and low heat conductivity and of good strength is laid down, which adheres firmly to the roof and to the membrane covering. No overspray problems are encountered and exposure of the operators to toxic fumes and sprays is minimized. The machine is capable of being operated by one man, rather than a team of men and the insulation laid down is of higher quality and is more rapidly and efficiently produced than by other known methods.

The invention has been described with respect to illustrations and examples thereof but is not to be limited to these inasmuch as it will be evident that one of skill in the art, with the present description before him will be able to utilize substitutes and equivalents without departing from the spirit of the invention.

What is claimed is:

1. A process for in situ preparation of a continuous foam-membrane sandwich and application thereof to a building surface which comprises depositing a fluid curable pre-foam of a rigid polymeric material between the building surface and the membrane while holding the membrane away from the building surface so that the pre-foam contacts the building surface and the membrane and moving forward on the building surface the locus of application of the pre-foam while maintaining a portion of the continuous membrane above the pre-foam being deposited and in contact therewith and curing the pre-foam to a rigid state so that a continuous foam-membrane sandwich is produced in which the rigid foam is held to the building surface and the membrane which covers it.

2. A process according to claim 1 wherein application of the pre-foam and the resulting foam-membrane sandwich is to a roof, a rail or previously applied foam-membrane sandwich acts as a side of a foam, the other sides of which are the surface to which the sandwich is being applied, the membrane and immediately previously applied foam and the locus of points of application of the pre-foam is moved forward when the foam is extruded to an end opposite the rail or previously laid course of foam-membrane sandwich.

3. A method according to claim 1 wherein the pre-foam being deposited is directed downwardly and backwardly against immediately previously applied foam.

4. A process according to claim 1 wherein the pre-foam is deposited in a reciprocating motion across a path along which the sandwich is produced.

5. A process according to claim 1 wherein the height or pitch of the membrane is controlled during the depositing of the foam and laying down of the membrane atop it.

6. A process according to claim 1 wherein the depositing of the pre-foam is coordinated with the laying of the cover membrane so that the pre-foam is deposited in a continuous form having as walls thereof the cover membrane and the building surface to which the foam-membrane sandwich is to be held, the building surface is a roof, floor, ceiling or wall of a building or other structure and the pre-foam is cured between the membrane and such building surface.

7. A method according to claim 6 wherein the pre-foam is of a normally rigid polyurethane and the membrane cover is a flexible material selected from the group consisting of roofing felt, fiberglass web, mat or cloth, tar paper, polyethylene, polypropylene, nylon, woven and non-woven cloths of natural or synthetic materials and other similar and suitable flexible membrane materials.

8. A method according to claim 7 wherein application of the pre-foam and the resulting foam-membrane sandwich is to a roof, a rail or previously applied foam-membrane sandwich acts as a side of a form, the other sides of which are the surface to which the sandwich is being applied, the membrane and immediately previously applied foam and the locus of points of application of the pre-foam is moved forward when the foam is extruded to an end opposite the rail or previously laid course of foam-membrane sandwich.

9. A process according to claim 8 wherein pre-foam is deposited in a reciprocating motion across the path along which the sandwich is produced.

10. A process according to claim 9 wherein the height or pitch of the membrane is controlled during the depositing of the foam and laying down of the membrane atop it.

* * * * *